(12) United States Patent
Wang

(10) Patent No.: US 8,240,867 B2
(45) Date of Patent: Aug. 14, 2012

(54) LED LAMP FOR AQUARIUM

(75) Inventor: Yu-Chin Wang, Taipei (TW)

(73) Assignee: Eiko Electric Products Corp., Taipei (TW)

( * ) Notice: Subject to any disclaimer, the term of this patent is extended or adjusted under 35 U.S.C. 154(b) by 179 days.

(21) Appl. No.: 12/897,689

(22) Filed: Oct. 4, 2010

(65) Prior Publication Data

US 2012/0081883 A1 Apr. 5, 2012

(51) Int. Cl.
*F21V 33/00* (2006.01)
*F21V 21/00* (2006.01)
*F21V 11/00* (2006.01)

(52) U.S. Cl. ................. 362/101; 362/398; 362/368

(58) Field of Classification Search .......... 362/101, 362/154, 217.01, 217.02, 217.05, 217.07, 362/217.12, 217.16, 351, 359, 368, 398, 362/190, 191
See application file for complete search history.

(56) References Cited

U.S. PATENT DOCUMENTS 3,326,185 A * 6/1967 Perez ............... 119/254
5,361,195 A * 11/1994 Chen ............... 362/397

FOREIGN PATENT DOCUMENTS

TW M347827 1/2009
TW M363204 8/2009

* cited by examiner

*Primary Examiner* — David Crowe
(74) *Attorney, Agent, or Firm* — Guice Patents PLLC

(57) ABSTRACT

An LED lamp for an aquarium is disclosed, wherein a shade mounted therein with an LED lamp pipe, a grooved edge of the shade is formed thereon a front slide groove and a rear slide groove, the front slide groove is inlaid therein with a lamp pipe clamp, the rear slide groove is inlaid therein with at least two magnetic blocks; by taking advantage of the magnetic attraction of the two magnetic blocks and the outer magnetic attraction blocks provided outside of the aquarium, the entire LED lamp pipe can be fixed at any position in the aquarium, and can suit various aquariums of different sizes to provide illumination.

4 Claims, 6 Drawing Sheets

LED LAMP FOR AQUARIUM

BACKGROUND OF THE INVENTION

1. Field of the Invention

The present invention relates to an LED lamp for an aquarium, and especially to an LED lamp adapted to being installed at any place in the aquarium.

2. Description of the Prior Art

A lamp can be provided above an aquarium for illumination in favor of viewing at night. Lamp structures of earlier days mostly have fluorescent lamps provided each below a lamp shade; in the recent time, technique of manufacturing light emitting diodes (LED) is progressed very fast, some LEDs are used as illumination lamps for aquariums, generally as shown in FIGS. 1 and 1A, an illuminating lamp 90 is provided with a plurality of LEDs 92 in a lamp shade 91, two clamps 93 on the lateral sides of the lamp shade 91 are fixed above an aquarium 2. For these, we can take reference to the prior art including two patent cases of Taiwan with a publication No. M347827 titled "LED ILLUMINATING LAMP FOR AQUARIUM" and a publication No. M363204 titled "PROJECTING LAMP STRUCTURE FOR AQUARIUM".

Such an LED lamp for an aquarium has the advantage of saving electricity, however, its structural design for installing on the aquarium is not good that it can only be installed above the aquarium, and must be changed for another size to meet the size of another aquarium used; therefore, multiple specifications are required to leave defects in making their cost of production higher and their assembling uneasy; thereby improvement is wanted.

SUMMARY OF THE INVENTION

Thereby the present invention provides an LED lamp for an aquarium which includes:

an LED lamp pipe in elongate cylindrical shape, having a stud extending out of one of its ends;

a shade having above it a bended sheet for covering over the LED lamp pipe, a grooved edge vertically extending downwards is provided on the left rim of the bended sheet, the grooved edge is formed thereon a front slide groove with an opening facing frontwards and a rear slide groove with an opening facing rearwards; a lateral sheet is fixedly provided on the right side of the bended sheet and the grooved edge, the lateral sheet is provided on its bottom with an inversed "V" shaped notch for extending of the stud therethrough;

a rotary member having at its center a threaded hole for screw connecting with the stud, in order that one end of the LED lamp pipe is fixed on the lateral sheet; the rotary member can be rotated to adjust the illumination angle of the LED lamp pipe;

at least a lamp pipe clamp with a pair of clamp arms for clamping the LED lamp pipe, it is provided on the rear of it with a rear protruding member to be inlaid in the front slide groove and to be positioned at any position in the front slide groove;

at least two magnetic blocks each with a front protruding member to be inlaid in the rear slide groove and to be positioned at any position in the rear slide groove, and each has a rear plane to be adhered to the inner surface of the aquarium; and at least two outer magnetic attraction blocks each with a front plane to be adhered to the outer side of the aquarium; the outer magnetic attraction blocks and the aforesaid magnetic blocks mutually attract to make fixing of the lamp shade and the LED lamp pipe in the aquarium.

The main object of the present invention is to provide an LED lamp for an aquarium, it uses the attraction of at least two outer magnetic attraction blocks provided outside of the aquarium and at least two magnetic blocks provided inside of the aquarium to fix the lamp shade and the LED lamp pipe at any position in the aquarium, and to provide illumination for the LED lamp pipe.

By the fact that the present invention makes positioning by the attraction of the outer magnetic attraction blocks and the magnetic blocks, installing of it on the aquarium is very convenient; and so long the aquarium is large enough for accommodating the shade and the LED lamp pipe, the present invention can be used no matter there is difference among various aquariums, this is largely better than the conventional techniques.

The present invention will be apparent in its structural feature and effect of use after reading the detailed description of the preferred embodiments thereof in reference to the accompanying drawings.

DETAILED DESCRIPTION OF THE PREFERRED EMBODIMENT

Figure 1A:
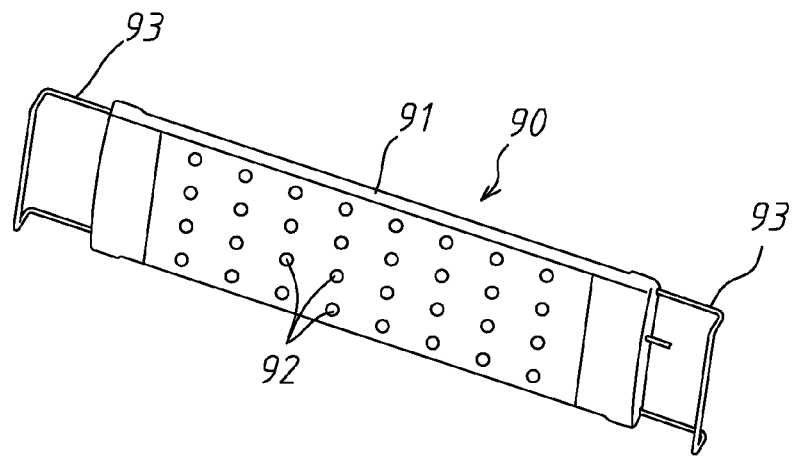
FIG. 1A is a perspective schematic view in another angular direction showing the conventional LED lamp for aquarium FIG. 1.
Figure 1:
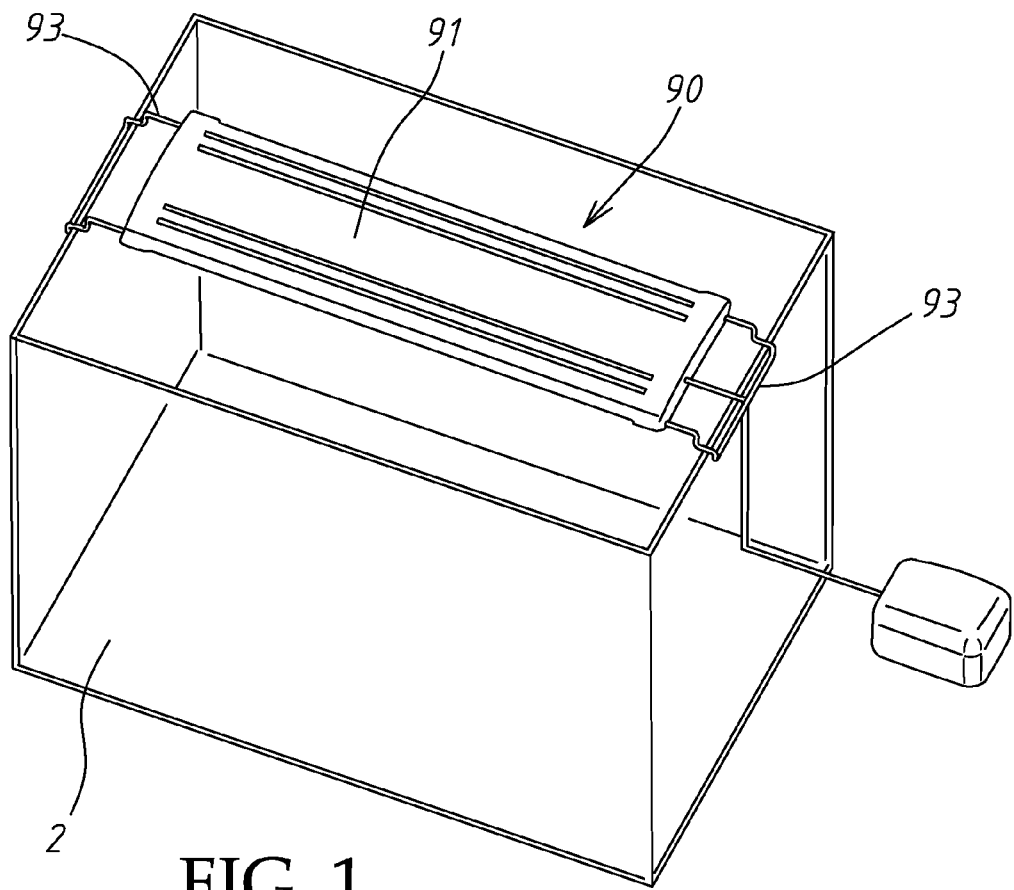
FIG. 1 is a perspective schematic view showing installing of a conventional LED lamp for aquarium on an aquarium.
Figure 2:
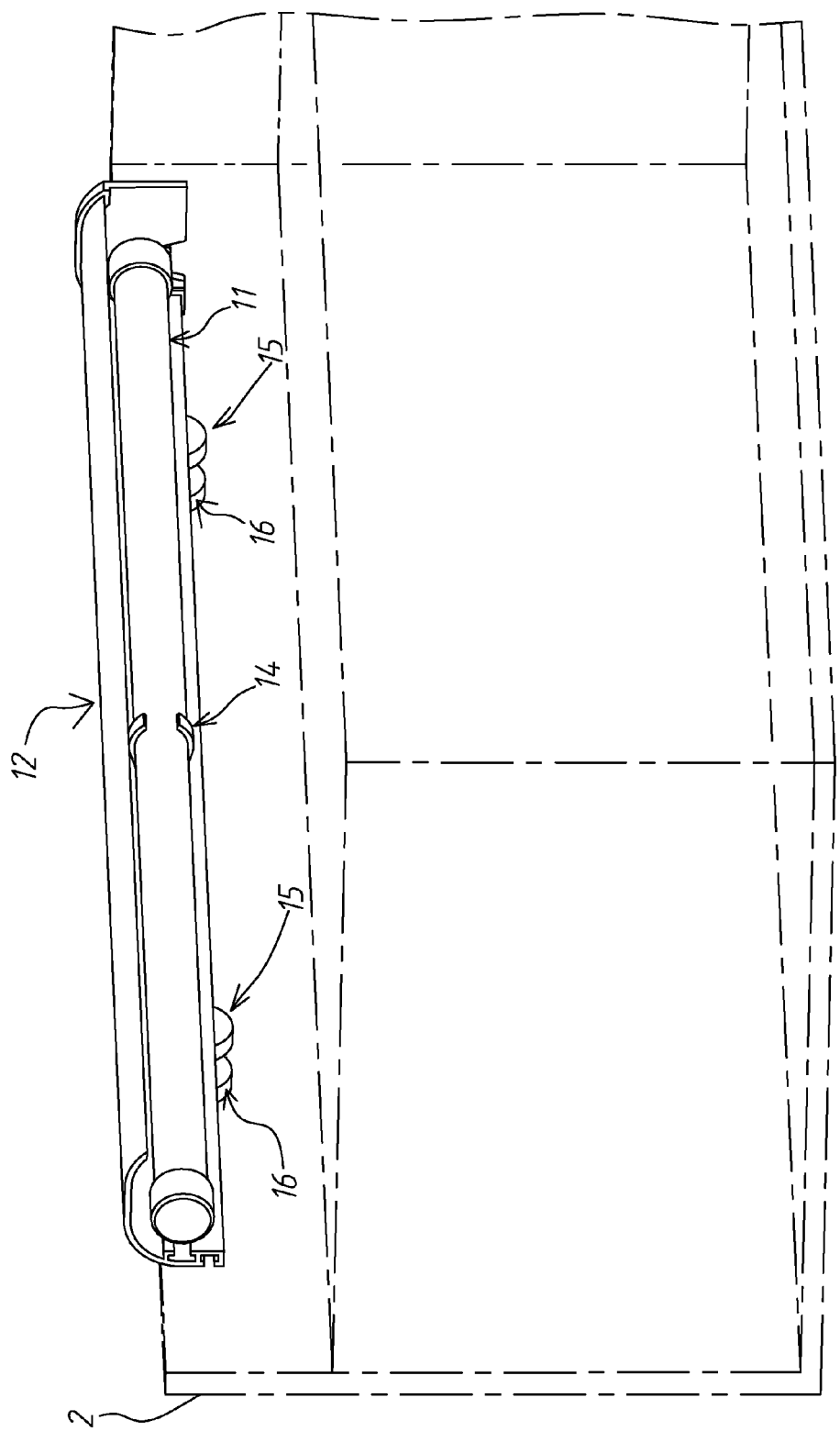
FIG. 2 is a schematic view showing installing of the present invention on an aquarium.
Figure 3:
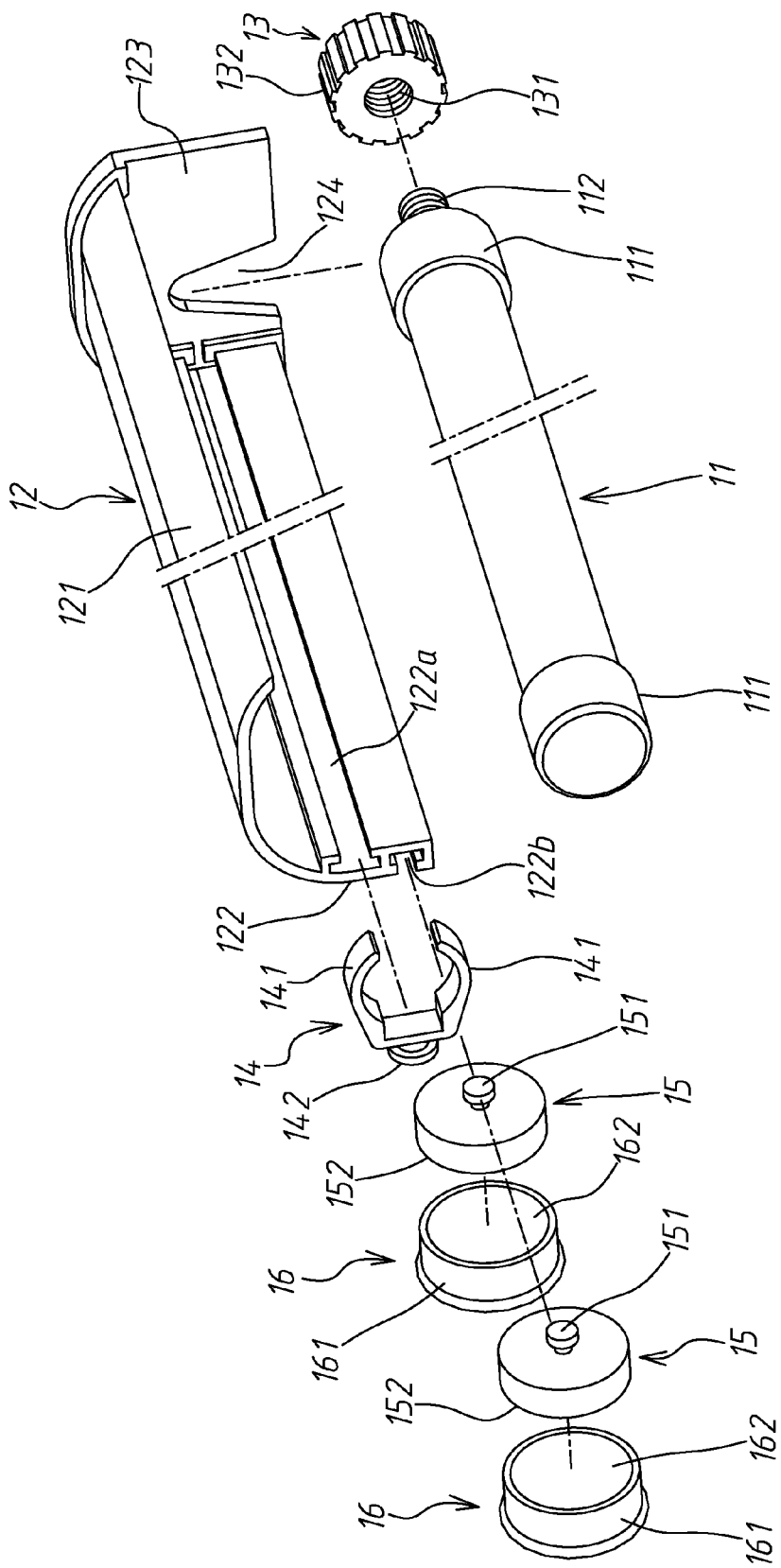
FIG. 3 is an anatomic perspective view of the present invention.
Figure 4:
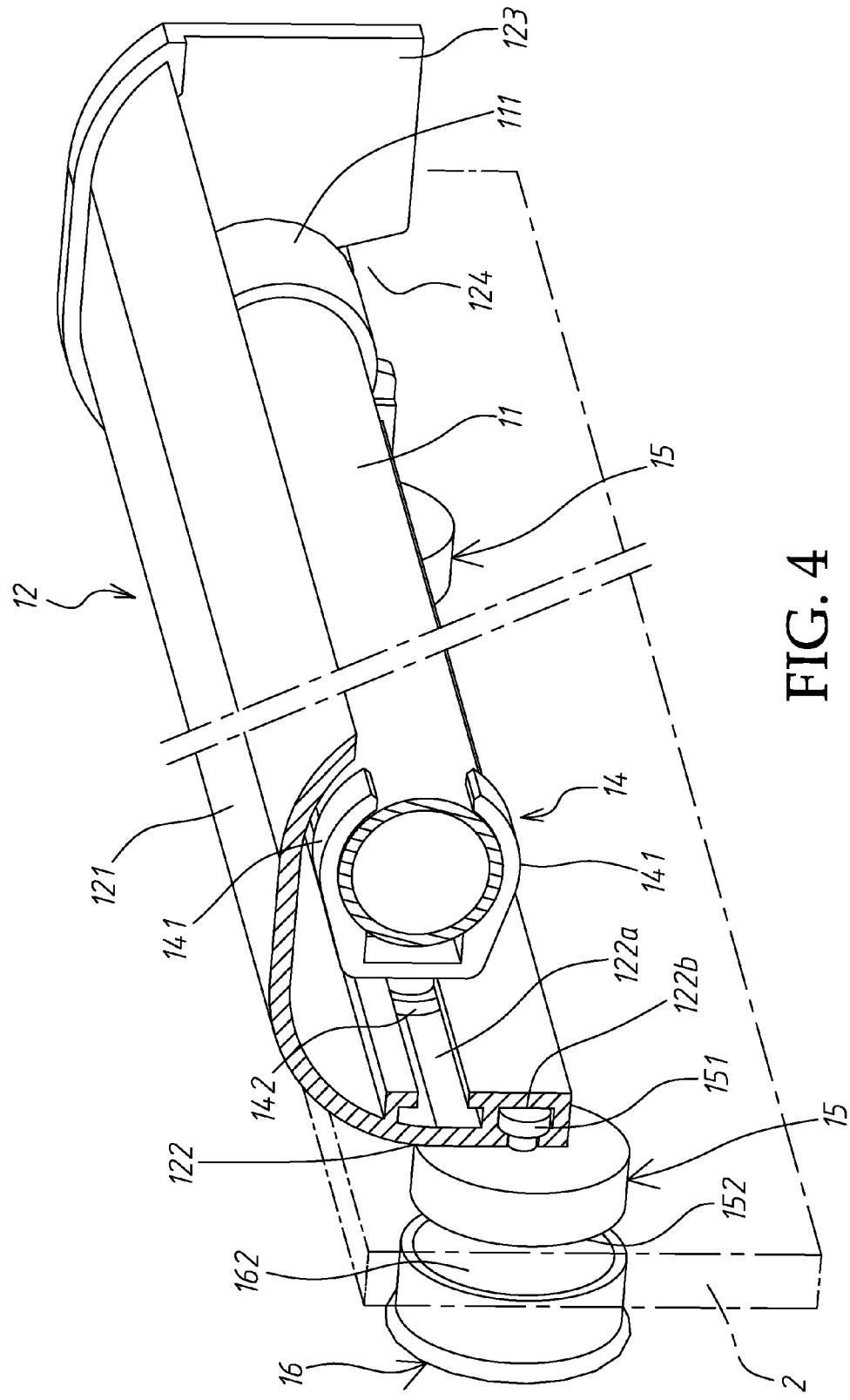
FIG. 4 shows an enlarged perspective view with partial sectional view of the present invention.

Referring to FIGS. 2-4, the LED lamp for aquarium of the present invention can be provided at any position in an aquarium 2 of the present invention, and comprises mainly an LED lamp pipe 11, a shade 12, a rotary member 13, at least a lamp pipe clamp 14, at least two magnetic blocks 15 and at least two outer magnetic attractive blocks 16.

The LED lamp pipe 11 is in elongate cylindrical shape, such as a T5 LED lamp pipe; its two ends are covered respectively by a protective sleeve 111, the right protective sleeve 111 has a stud 112 extending out of the right end.

The shade 12 provided in the present invention has above it a bended sheet 121 for covering over the LED lamp pipe 11, a grooved edge 122 vertically extending downwards is provided on the left rim of the bended sheet 121, the grooved edge 122 is formed thereon a front slide groove 122a with an opening facing frontwards and a rear slide groove 122b with an opening facing rearwards. A lateral sheet 123 is fixedly provided on the right side of the bended sheet 121 and the grooved edge 122, the lateral sheet 123 is provided on its bottom with an inversed "V" shaped notch 124 for extending of the stud 112 of the LED lamp pipe 11 therethrough. And the rotary member 13 has at its center a threaded hole 131 for screw connecting with the stud 112 of the LED lamp pipe 11, in order that one end of the LED lamp pipe 11 is fixed on the lateral sheet 123; the rotary member 13 is provided on its outer periphery with knurs 132 (such as the straight knurs as shown in the drawing) for increasing friction force, and can be rotated to adjust the illumination angle of the LED lamp pipe 11.

Figure 5:
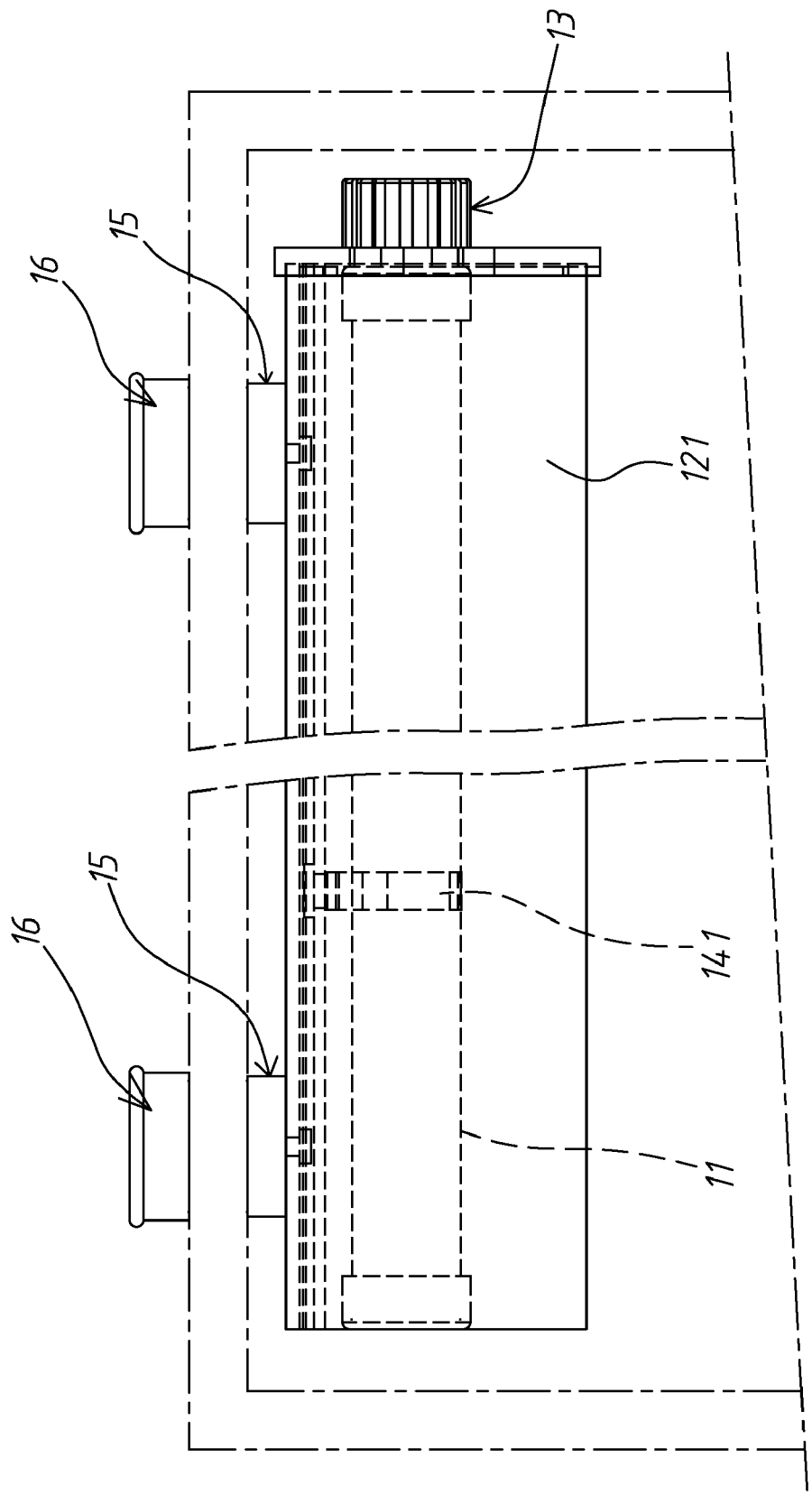
FIG. 5 is a top view showing installing of the present invention on the aquarium.
Figure 6:
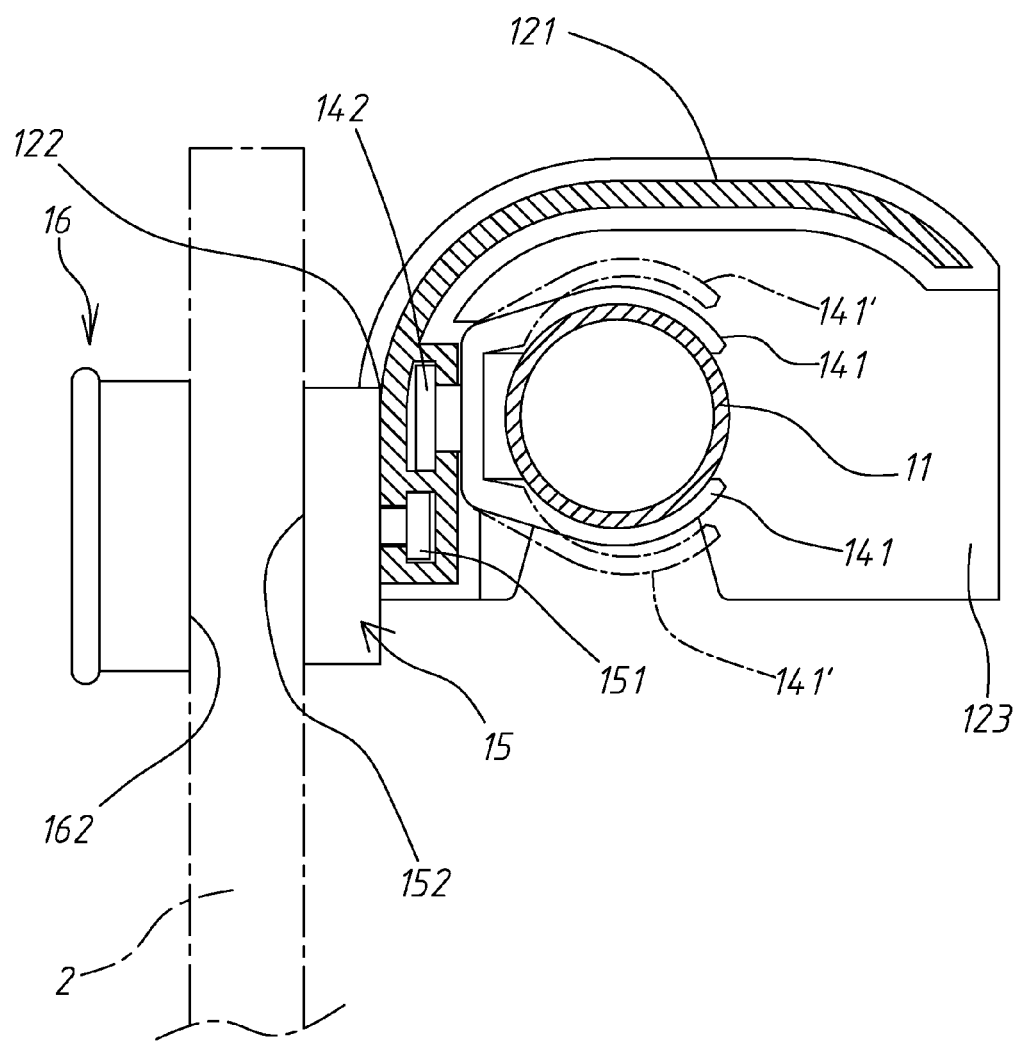
FIG. 6 is a sectional side view showing installing of the present invention on the aquarium.

The present invention at least has a lamp pipe clamp 14 (its amount can be increased in pursuance of the length of the lamp pipe 11). The lamp pipe clamp 14 has a pair of clamp arms 141 for clamping the LED lamp pipe 11, and is provided on the rear of it with a rear protruding member 142 to be inlaid in the front slide groove 122*a* as are shown in FIGS. 4 and 6, and to be positioned at any position in the front slide groove 122*a* as shown in FIG. 5. Referring to FIG. 6, the clamp arms 141 for clamping the LED lamp pipe 11 can be adjusted to meet the radius of various LED lamp pipes.

The present invention at least has two magnetic blocks 15 (their amount can be increased in pursuance of the length of the lamp pipe 11) each with a front protruding member 151, to be inlaid in the rear slide groove 122*b* as shown in FIGS. 4 and 6, and to be positioned at any position in the rear slide groove 122*b* as shown in FIG. 5. Each magnetic block 15 has a rear plane 152 to be adhered to an inner surface of the aquarium. And at least two outer magnetic attraction blocks 16 (their amount can be increased in pursuance of the number of the magnetic blocks 15); the outer surfaces of outer magnetic attraction blocks 16 are covered with non metallic sleeves 161, and each has a front plane 162 to be adhered to the outer side of the aquarium.

The main design of the present invention (referring to FIGS. 2 and 4) takes advantage of the magnetic attraction of the at least two outer magnetic attraction blocks 16 provided outside of the aquarium 2 and at least two magnetic blocks 15 provided inside of the aquarium 2 to fix the lamp shade 12 and the LED lamp pipe 11 at any position in the aquarium 2, and to provide illumination for the LED lamp pipe 11.

By the fact that the present invention makes positioning by the attraction of the outer magnetic attraction blocks 16 and the magnetic blocks 15, installing of it on the aquarium 2 is very convenient; and so long the aquarium 2 is large enough for accommodating the shade 12 and the LED lamp pipe 11, the present invention can be used no matter there is difference among various aquariums, this is largely better than the conventional techniques.

In conclusion, the LED lamp for aquarium of the present invention is novel that meets the element requirement for a patent;

What I claim as new and desire to be secured by Letters Patent of the United States is:

1. An LED lamp for an aquarium comprising:
    an LED lamp pipe having an elongate cylindrical shape, with a stud extending out of one end thereof;
    a shade having an upper bended sheet for covering over said LED lamp pipe, a grooved edge vertically extending downward from a left rim of said bended sheet, said grooved edge comprising a front slide groove with an opening facing toward the LED lamp pipe and a rear slide groove with an opening facing away from the LED lamp pipe; a lateral sheet is fixedly provided on a right side of said bended sheet and said grooved edge, the bottom of said lateral sheet is provided with an inversed "V" shaped notch for allowing said stud to extend therethrough;
    a rotary member having a threaded hole for connecting with said stud, such that one end of said LED lamp pipe is fixed on said lateral sheet; said rotary member is adapted for being rotated to adjust the illumination angle of said LED lamp pipe;
    at least one lamp pipe clamp comprising a pair of clamp arms for clamping said LED lamp pipe, and a rear protruding member to be inlaid in said front slide groove and to be positioned at any position along said front slide groove;
    at least two magnetic blocks, each comprising a front protruding member to be inlaid in said rear slide groove and to be positioned at any position along said rear slide groove, and each magnetic block having a rear plane to be adhered to an inner surface of said aquarium; and
    at least two outer magnetic attraction blocks, each having a front plane to be adhered to an outer side of said aquarium, said at least two outer magnetic attraction blocks and said at least two magnetic blocks mutually attract to fix said lamp shade and said LED lamp pipe in said aquarium.

2. The LED lamp for an aquarium as claimed in claim 1, wherein the outer periphery of said rotary member is provided with knurls for increasing friction force.

3. The LED lamp for an aquarium as claimed in claim 1, wherein outer surfaces of said outer magnetic attraction blocks are covered with non metallic sleeves.

4. The LED lamp for an aquarium as claimed in claim 1, wherein the two ends of said LED lamp pipe are covered respectively by a protective sleeve, a right one of said protective sleeves having said stud extending out of a right end thereof.

\* \* \* \* \*